US010872066B2

(12) United States Patent
Martin et al.

(10) Patent No.: US 10,872,066 B2
(45) Date of Patent: Dec. 22, 2020

(54) SYSTEMS AND METHODS OF DATABASE TENANT MIGRATION (71) Applicant: salesforce.com, inc., San Francisco, CA (US)

(72) Inventors: Jameison Bear Martin, Oakland, CA (US); Nathaniel Wyatt, San Francisco, CA (US); Gary J. Baker, Glenbrook, NV (US); Thomas Fanghaenel, Oakland, CA (US); Terry Chong, Pleasanton, CA (US)

(73) Assignee: Salesforce.com, inc., San Francisco, CA (US)

( * ) Notice: Subject to any disclaimer, the term of this patent is extended or adjusted under 35 U.S.C. 154(b) by 280 days.

(21) Appl. No.: 15/634,779

(22) Filed: Jun. 27, 2017

(65) Prior Publication Data
US 2018/0373708 A1    Dec. 27, 2018

(51) Int. Cl.
*G06F 17/30*    (2006.01)
*G06F 16/21*    (2019.01)
*G06F 16/22*    (2019.01)

(52) U.S. Cl.
CPC ........ *G06F 16/214* (2019.01); *G06F 16/2246* (2019.01); *G06F 16/2282* (2019.01)

(58) Field of Classification Search
CPC . G06F 16/214; G06F 16/2246; G06F 16/2282
See application file for complete search history.

(56) References Cited

U.S. PATENT DOCUMENTS

| | | | | |
|---|---|---|---|---|
| 9,223,612 B1 * | 12/2015 | Feldman | ................. | G06F 9/465 |
| 2013/0132349 A1 * | 5/2013 | Hahn | ................. | G06F 16/2282 |
| | | | | 707/649 |
| 2014/0195492 A1 * | 7/2014 | Wilding | ............. | G06F 11/1471 |
| | | | | 707/684 |
| 2015/0038831 A1 | 2/2015 | Yang | | |

(Continued)

FOREIGN PATENT DOCUMENTS

WO    2019005753    1/2019

OTHER PUBLICATIONS

PCT International Search Report for PCT/US2018/039441, dated Sep. 12, 2018, 14 pages.

(Continued)

*Primary Examiner* — Usmaan Saeed
*Assistant Examiner* — William P Bartlett
(74) *Attorney, Agent, or Firm* — Butzel Long (57) ABSTRACT

Systems and methods are provided for migrating a tenant of a database system from a source database instance to a destination database instance. The systems and methods include quiescing the tenant data of the tenant to be migrated from the source database instance to the destination database instance so that no new data is written to the storage of the database system associated with the tenant identifier at the source database instance, transmitting metadata of the tenant to be migrated from the source database instance to the destination database instance, and modifying, at the destination database instance, the metadata of the tenant so that the destination database instance has information to point to groupings of data in the storage for the destination database to access the tenant data.

12 Claims, 8 Drawing Sheets

(56) References Cited

U.S. PATENT DOCUMENTS

| | | | | |
|---|---|---|---|---|
| 2015/0146539 A1* | 5/2015 | Mehta | ............... | H04L 45/22 |
| | | | | 370/237 |
| 2015/0254240 A1 | 9/2015 | Li | | |
| 2016/0335108 A1* | 11/2016 | Ryu | ............... | G06F 9/45558 |
| 2017/0364704 A1* | 12/2017 | Wright | ............ | G06F 21/6227 |

OTHER PUBLICATIONS

Lawrence C. Miller: "Oracle Multitenant for Dummies", Jan. 1, 2013 (Jan. 1, 2013), XP055503493, ISBN: 978-1-118-73150-5 Retrieved from the Internet: URL:https://www.kennisportal.com/KP/Avnet/E-book-Oracle-Multitenant-for-Dummies.pdf [retrieved on Aug. 30, 2018] p. 5—p. 40.

International Preliminary Report for Application No. PCT/US2018/039441, dated Dec. 31, 2019, 7 pages.

International Preliminary Report on Patentability for Application No. PCT/US2018/039441, dated Dec. 31, 2019, 7 pages.

Australian Examination Report No. 1 for App. No. AU2018290745, dated Jul. 31, 2020, 4 pages.

\* cited by examiner

SYSTEMS AND METHODS OF DATABASE TENANT MIGRATION

BACKGROUND

In a database management system (DBMS), elasticity refers in part to the ability to adjust system scale on demand as needed, for example, to achieve load-balancing goals, optimize system resources during high load periods, consolidate tenants during low-load periods, etc. Tenant migration, that is, moving tenant data from one server to another, plays a large role in increasing elasticity as well as improving basic database management functionality. A conventional DBMS handles tenant migration by copying all the tenant data from one database instance to another. Depending on the amount of tenant data, this typically requires the execution of multiple operations on both the source and destination database instances. Computational costs are incurred to extract and subsequently remove the source data from the source database instance and to add it to the destination database instance. Additionally, steps often must be taken to ensure that all the tenant data is copied correctly.

In a conventional database, a tenant migration process often is slow, resource heavy, and error prone, in part because migrating a tenant involves copying all rows for the tenant from the source to the target instance.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, etc. In other instances, well-known structures and devices are shown in block diagram form to facilitate describing the subject disclosure.

A conventional DBMS handles tenant migration by copying all the tenant data from one database instance to another. Conventional migration systems and methods are typically resource-heavy (i.e., they require a substantial amount of computing, datapath, network, and/or storage resources to copy an entire set of data) and error prone. For example, tenant data migrated via a series of time-consuming row-by-row copy operations can be copied incorrectly, can be missing portions, can be corrupted, or the like. Copying row-by-row can be slow and resource intensive for both the source and the target database instance, and it temporarily doubles the tenant's storage requirements. Often a tenant's data cannot be copied in full in a single transaction, thereby necessitating a complicated process of reconciling inconsistent data from multiple copy operations before the migration can be completed.

Implementations of the disclosed subject matter can migrate a tenant of a database system from a source database instance to a destination database instance without requiring row-by-row data copying, duplication of production data or operation on duplicated production data. As will be described below, the disclosed migration can be completed faster than conventional tenant migration techniques and at lower cost in terms of processor resources, data storage and persistence resources, and/or datapath (e.g., communication network) resources. In many cases, no consistency checks or other corrective measures need to be taken with respect to the migrated data, thereby saving additional time and system resources.

The disclosed tenant migration techniques can be applied to a variety of different database structures. The disclosed subject matter is not limited to a single type of architecture, but for illustrative purposes, the discussion below will describe implementation using a log structured merge (LSM) tree with key-range multi-tenancy. LSM-trees are capable of describing data changes with immutable data versions. Key-range multi-tenancy allows dynamic binding to servers and can be used to keep each tenant's data separate.

An LSM-tree can be used in a relational database that stores persistent contents of records, a single key space rooted by a tenant identifier (i.e., "tenant ID"), and by using persistence virtualization. The persistence can be implemented using extents. An "extent" refers to a region of storage, typically continuous within a storage medium, which can be used to store data. Extents can be immutable. That is, the extents may not be modified after they are created, such that the region and data associated with the extent within the storage medium are not updated, but may be deleted in the future. An extent reference may be used as a logical reference to a physical extent that is stored in physical storage (e.g., a storage device), and may be used to virtualize access to the physical storage. Extents may be ordered by key.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, etc. In other instances, well-known structures and devices are shown in block diagram form to facilitate describing the subject disclosure.

Figure 1A:
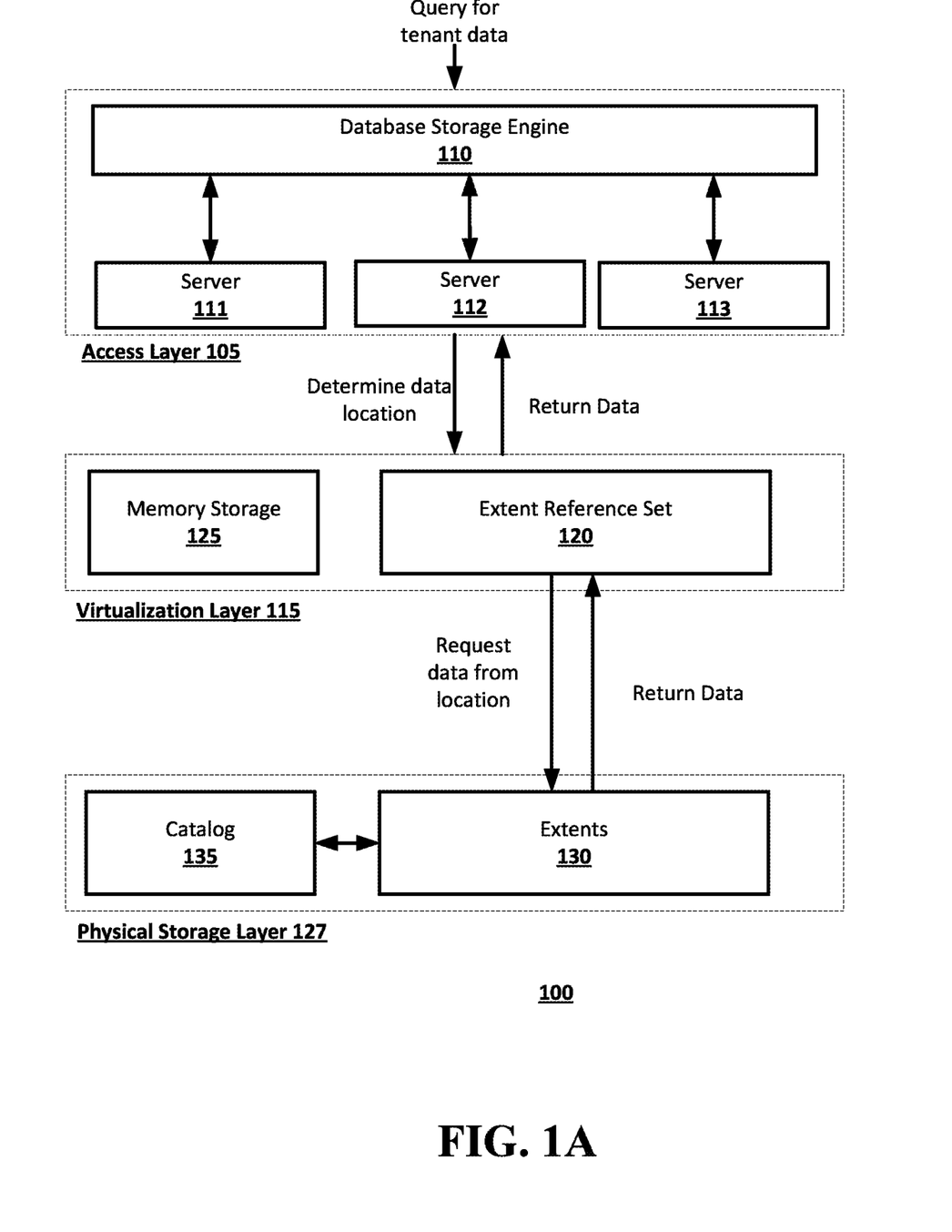
FIG. 1A shows an example system and method of storing and retrieving data using a virtualization layer according to an implementation of the disclosed subject matter.

An extent reference can be used as a logical reference to a physical extent that is stored in physical storage (e.g., a storage device), and can be used to virtualize access to the physical storage. FIG. 1A shows an example system 100 for implementing the disclosed tenant migration techniques. The system 100 can operate on a single computing device or multiple connected computing devices. For example, the system 100 can be implemented on a laptop, a desktop, an individual server, a server cluster, a server farm, or a distributed server system, or can be implemented as a virtual computing device or system, or any suitable combination of physical and virtual systems. For simplicity, various parts such as the processor, the operating system, and other components of the database management system are not shown.

The system 100 can be part of a computing system and network infrastructure, or can be otherwise connected to the computing system and network infrastructure, including a larger server network which can include other server systems similar to system 100. In some implementations, system 100 can be the computer 600, central component 700, and or the second computer 800 shown in FIG. 4, and/or one or more of the database systems 1200a-1200d shown in FIGS. 5A-5B.

The system 100 can store data in immutable extents. Each extent can have a unique id, or key, assigned by the system 100. The key can include various types of information, such as a tenant identifier to indicate which tenant the data is associated with.

The system 100 includes an access layer 105, a virtualization layer 115, and a physical storage layer 127. The access layer 105 can include one or more servers 111, 112, 113 that provides a platform for tenants to host applications and databases on and functions as a primary interface for users to interact with the system 100. The access layer 105 can also include a database storage engine 110 that can handle load balancing across the servers 111, 112, 113 and can accept and process a query for the system 100 from a computing device (e.g., computer 600 and/or a second computer 800 shown in FIG. 4). For example, the database storage engine 110 can receive a query from a tenant organization and process the query to transmit a command to the virtualization layer 115. The database storage engine 110 can be any suitable combination of hardware and software on the server system 100 for receiving queries for the database system, and retrieving data related to the received query.

The virtualization layer 115 virtualizes tenant data to provide each tenant with system services, such as customized databases, that allow the tenant to access only the tenant's own data even though data from multiple tenants may be stored in the system 100. The virtualization layer can include an extent reference set 120 and a memory storage 125. In some implementations, the extent reference set 120 and memory storage 125 can be stored in the central component 700 shown in FIG. 4 and/or database systems 1200a-1200d shown in FIGS. 5A-5B. The memory storage 125 stores a newest version of tenant data before the data is recorded to an extent in the physical storage layer 127. The extent reference set 120 can use metadata from tenant data to define where extents are located in the physical storage physical storage 127 (e.g., where tenant data can be stored as part of extents 130, as described below). The metadata can include, for example, key ranges that define which keys are visible in an extent, transaction numbers that indicate a transaction order of the extents, and tenant ID data that associate the extent with a given tenant. The extent reference set 120 can be implemented using any suitable combination of hardware and software on the server system 100 that can operate to provide the functionality of a logical reference to a physical extent that is stored in physical storage 127 (e.g., a storage device).

The virtualization layer 115 can receive a query from the database storage engine 110 and find requested data by checking whether the most up-to-date version of the data is in memory storage 125 or, by referring to the extent reference set 120, whether it is already stored in extents 130 in the physical storage layer 127. The query can be received, for example, from an authorized user of the database system that is associated with at least one tenant. If the data has already been moved to physical storage 127, the virtualization layer 115 can locate the requested data based on metadata in the extent reference set. That is, the virtualization layer 115 can retrieve the data requested by the query from the extent 130, and can return the data to the database storage engine 110 which can provide it to, for example, the computing device that transmitted the query to the database system.

The physical storage layer 127 can include an immutable data storage device and can be implemented, for example, as a semiconductor memory, a solid-state drive (SSD), hard disk drive, optical memory, an optical storage device, or any other suitable physical data storage medium, or some combination thereof. The physical storage layer 127 can include the extents 130, which are immutable versions of tenant data, and a catalog 135 to manage the identity and lifetime of the extents, as well as manage track data capacity to manage hardware, such as storage devices and servers that can store the extents.

As new tenants are added and/or current tenants grow, shrink or leave, the allocation of resources in system 100 can become inefficient over time. For example, a relatively high number of tenants may be operating on server 111 while a relatively low number of tenants is operating on servers 112, 113. As another example, a single tenant on sever 111 may be using a disproportionate ratio of resources causing latency issues for other tenants on the server, or a tenant may be growing too large for a single server. In any of these or other situations, to consolidate data, facilitate efficient storage management, and/or avoid failures that may break atomicity or consistency, a tenant migration from one server to another may be necessary or desirable.

In the database systems (e.g., system 100 shown in FIG. 1A, central component 700 and/or second computer 800 shown in FIG. 4, and/or database systems 1200a-1200d shown in FIGS. 5A-5B) and the methods of tenant migration described throughout, a record may be identified as a key-value pair in the instance of a multitenant system. Tenancy in the databases may be created, and an authorized user associated with a tenancy may view, access, and/or perform operations for that tenancy. The value may be, for example, the contents of a row of a table of a relational database, an identification of a row in a table of a relational database, or any other suitable value. The key may be an identifier for the record, and may in any suitable form, such as, for example, an alphanumeric sequence. Portions of the key may provide information about the contents of the record. For example, a portion of the key may be a tenant identifier, which may uniquely identify the tenant to whom the contents of the record belong. Other portions of the key may identify, for example, a table number and identification of a row, for example, when the value of a record is the contents of a row, or table number, index number on the table, and an identification of indexed columns when the value is the identification of a row.

The database system (e.g., system 100 shown in FIG. 1, central component 700 and/or second computer 800 show in FIG. 4, or databases 1200a, 1200b, 1200c, and/or 1200d shown in FIGS. 6A-6B) may store transactions as immutable versions of given records. Immutable versions of contents of records already stored on the server system may be unchanged until the contents are deleted (if ever) from the server system. That is, a received transaction may create a new version of the contents of the record to be stored in the server system, instead of altering the contents of the record. Thus, it may be possible for multiple versions of a record (e.g., records having different contents) as disclosed herein to have identical keys except for transaction identifiers. The use of otherwise identical keys for versions of a given record may allow for the changing of data stored in the relational database. As such, each version of the physical record may be immutable; i.e., it is either not deleted or is not deleted over an arbitrarily long period of time that may be months, years or decades. For example, a later version of a record with an identical key (other than the transaction version identifier) to an earlier version of the record may indicate a change in the data value for that record (i.e., the change in contents of the record). Alternatively, a transaction may create a record or delete a record (i.e., create contents or delete contents). Records may be deleted by inserting a 'tombstone' (e.g., a marker identifying the data to be deleted), and, at a future point in time, a new extent can be written which no longer includes the record marked by the tombstone.

Time stamps or other time identifiers may be made at the creation of a tenant. Thereafter, tenant data may interpret primary key requests for versions of the data before the time stamp by accessing the appropriate version based on the key in the pool of the data stored before the time stamp. Keys for the respective tenants accessing data created or updated after the time stamp will be interpreted to access the appropriate data created by the tenant. Alternatively, rather than using time stamps, each transaction in the database may have a unique transaction number associated with it that is monotonically increasing for each subsequent transaction and the system may note the most recently created transaction identifier in lieu of the time stamp.

Figure 1B:
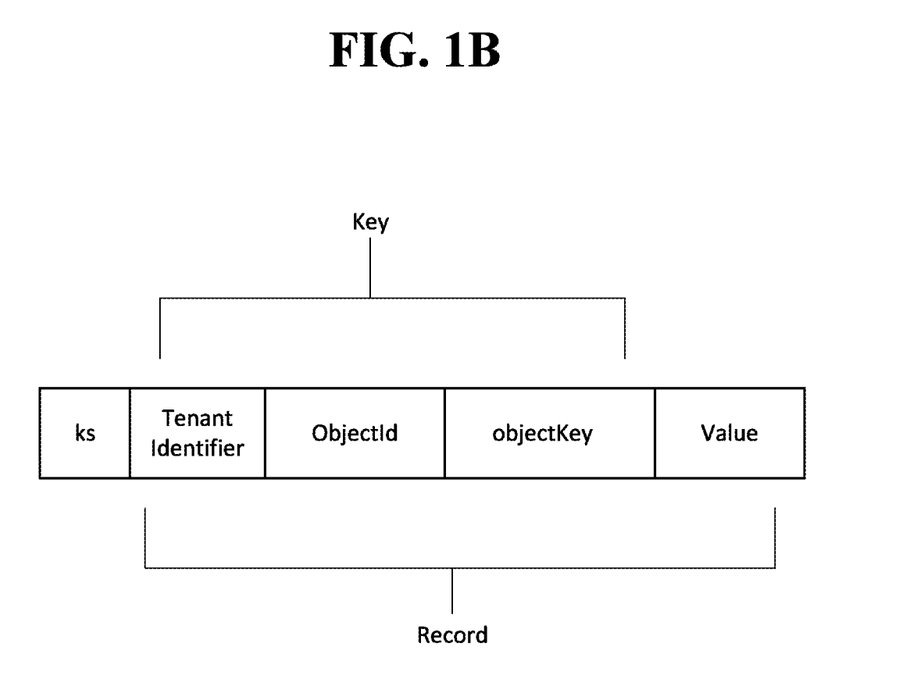
FIG. 1B shows an example of a record in a database system according to an implementation of the disclosed subject matter.

FIG. 1B shows an example record used in a database system (e.g., system 100 shown in FIG. 1, the systems shown in FIG. 2A-2C, central component 700 and/or second computer 800 shown in FIG. 3, or database systems 1200a-1200d shown in FIGS. 6A-6B) according to an implementation of the disclosed subject matter. Records can be keyed by a keyspace (ks), a tenant identifier, an object identifier (objectId), and/or an object key (ObjectKey). As shown in FIG. 1B, the record may include the tenant identifier, the objectId, and the objectKey. The key of the record may include the tenant identifier, the objectId, and the objectKey. In implementations of the disclosed subject matter, the keys and/or the values may be variable in length. As discussed above, data extents in implementations of the disclosed subject matter may be sorted by key, and organized by levels in a LSM tree according to a commit time. The database system as disclosed herein may have an immutable storage, which may be used in relational database that stores persistent contents of records, a single key space rooted by a tenant identifier, and by using persistence virtualization. The persistence may be made up of extents. An extent is a typically contiguous region of storage which may be used to store data. As discussed above, extents may be immutable and may be ordered by key.

In implementations of the disclosed subject matter, data extent references may be organized into level. A level may cover a single key range that may be grouped into data extents references that are ordered by key.

Reducing and/or minimizing a number of levels of organized data may increase the rewriting of data as new data arrives. Each level may have a maximum size threshold, and the level sizing may increase exponentially. When the size threshold is exceeded, a merge operation may be performed by the database system (e.g., system 100 of FIG. 1A, the system shown in FIGS. 2A-2C, and/or database systems 1200a-1200d shown in FIGS. 5A-5B), where data is merged from level N to level N+1.

Data is not moved from the memory storage of the database system (e.g., memory storage 1230 shown in FIG. 5B) until data has been made persistent via a flush operation, and queries have moved up to latest view of persistence. For example, in a flush operation, data is copied from the memory storage 1230 to the storage 1260 shown in FIG. 5B. That is, in the flush operation, one or more extents are moved from the memory storage 1230 to the storage 1260 (i.e., persistent storage). This may be done in key order for a particular transaction range.

Figure 2A:
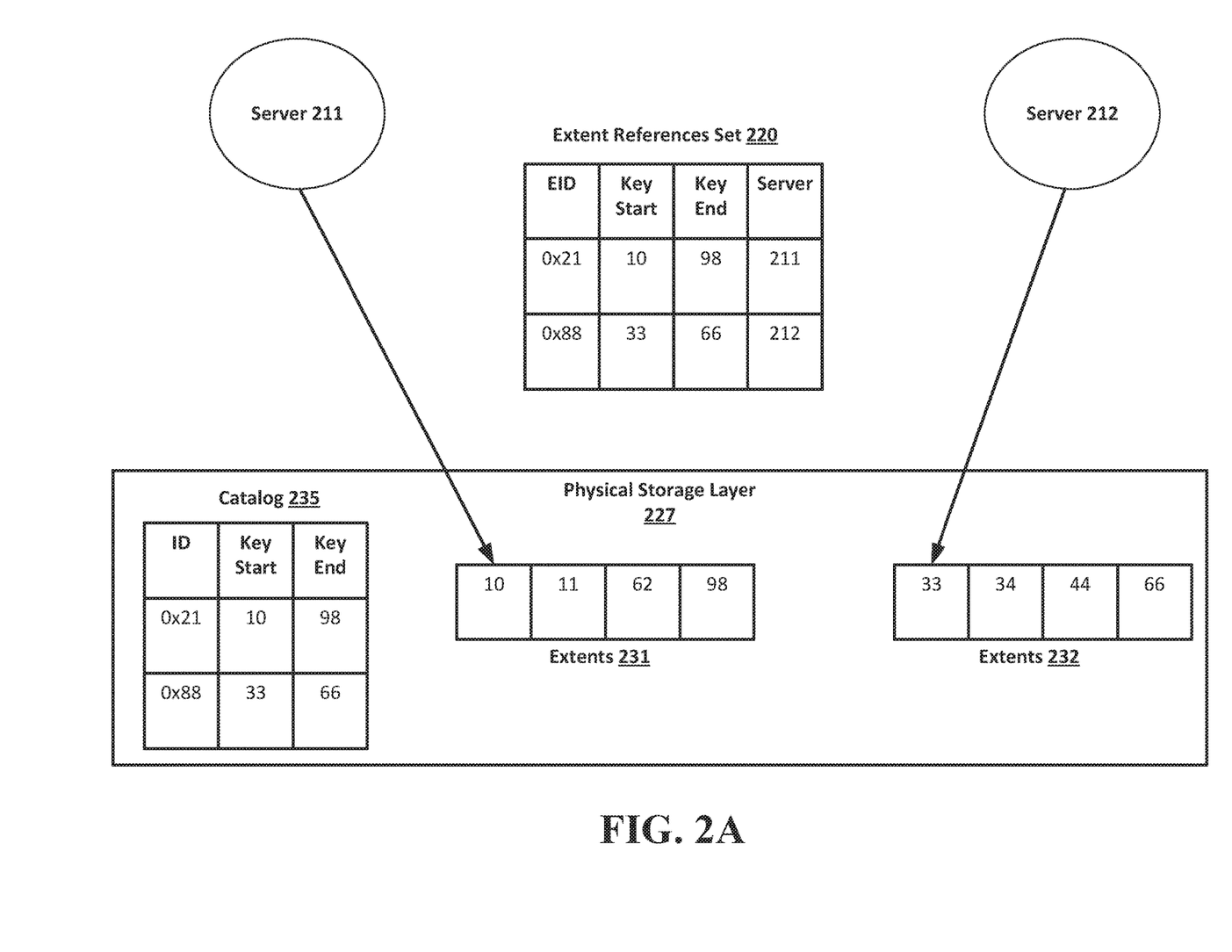
FIGS. 2A-2C show an example of a tenant migration according to an implementation of the disclosed subject matter.
Figure 2B:
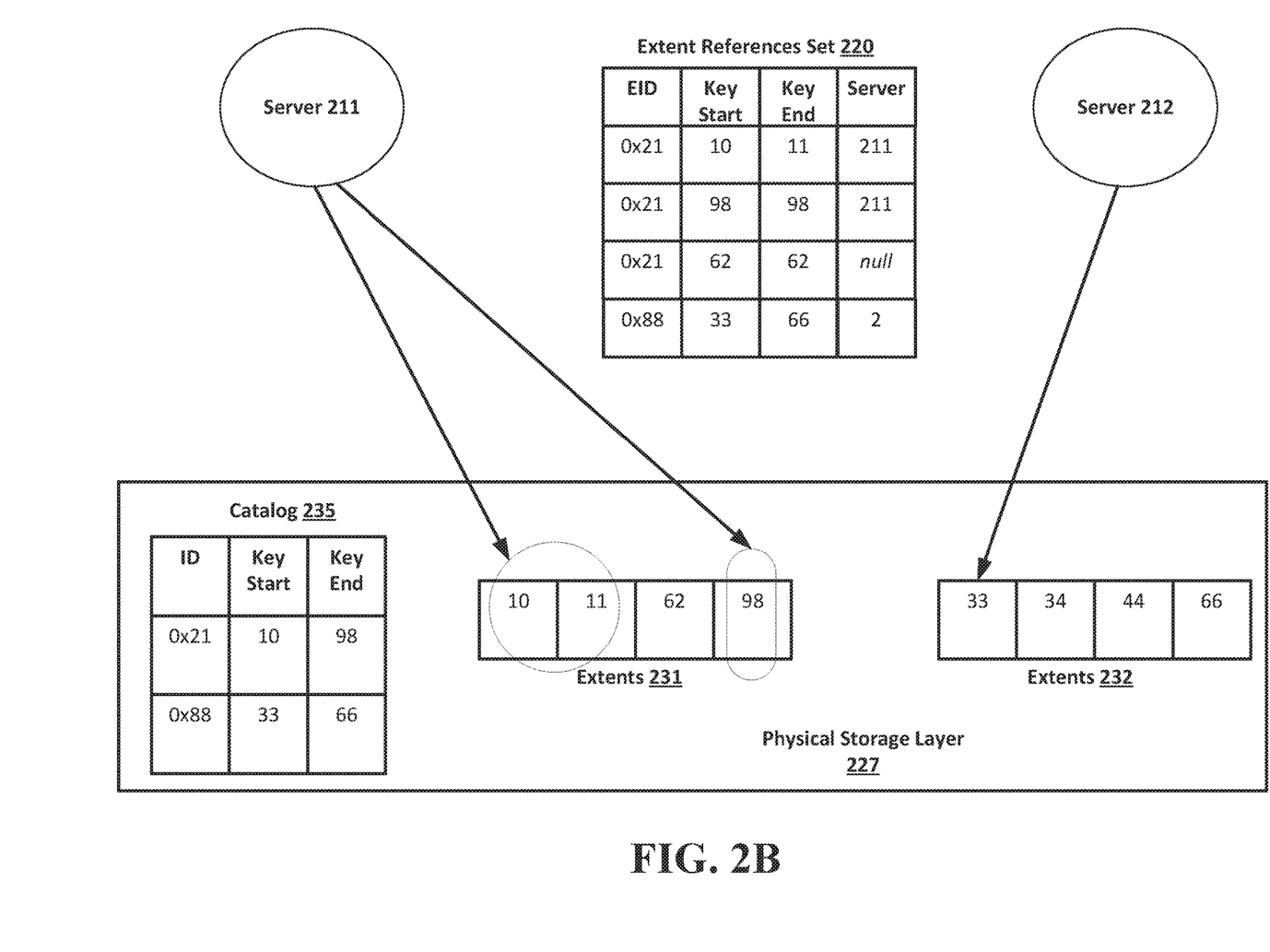
Figure 2C:
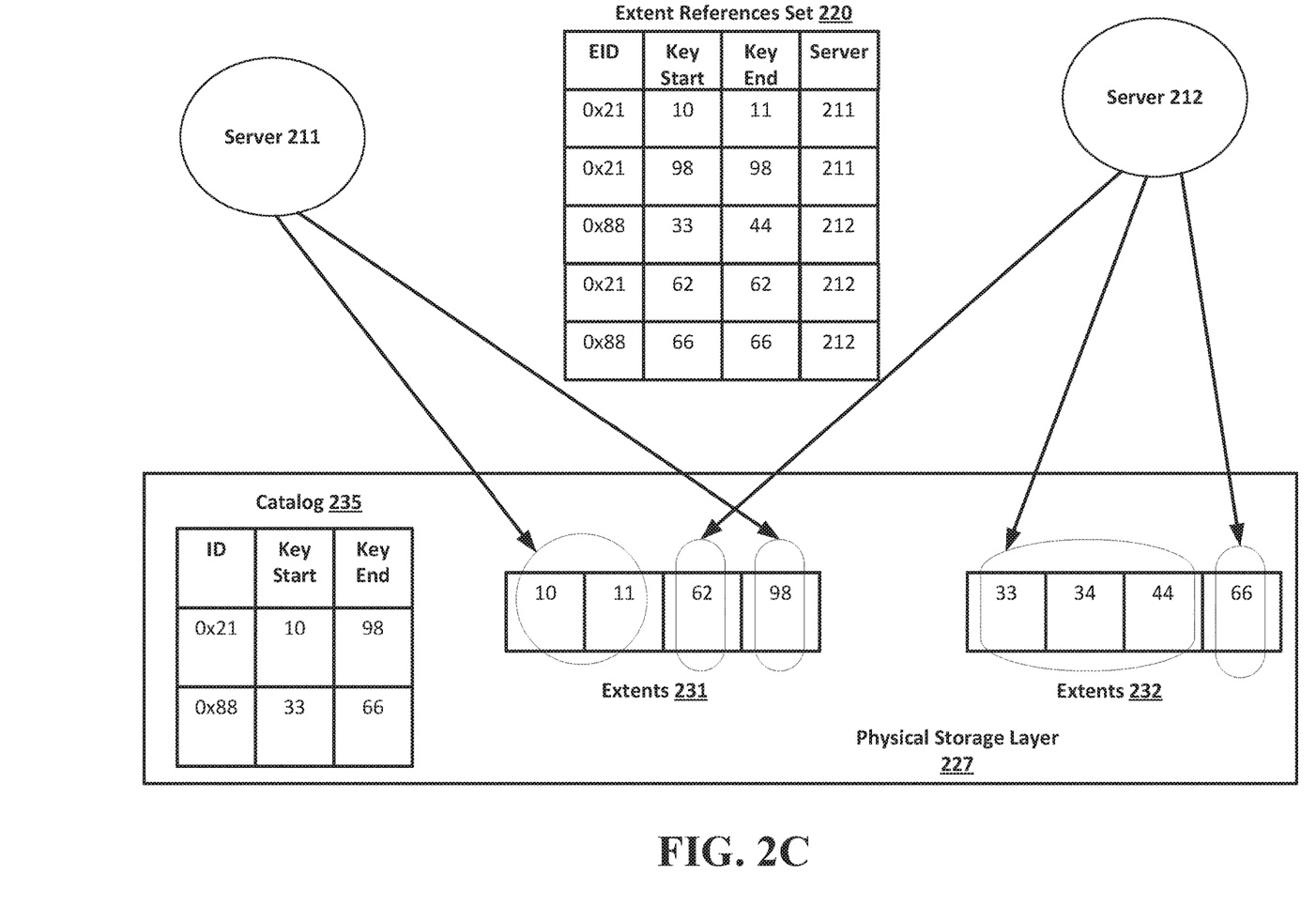

FIGS. 2A-2C show an example of a tenant migration according to an implementation of the disclosed subject matter. FIG. 2A shows a sever 211 that hosts tenants with tenant IDs 10, 11, 62, and 98, and a sever 212 that hosts tenants with tenant IDs 33, 34, 44 and 66. The tenant IDs each correspond with an extent key. Severs 211, 212 correspond to servers 111, 112 in FIG. 1, residing in the access layer 105. A data extent references set 220 contains the extent IDs (EID) and key ranges of the extents that store corresponding data for each of the tenants. Extents 231, 232 are stored in a physical storage layer 227. A catalog 235 tracks the ID and key range of the extents 231, 232. The data extent references set 220, catalog 235, and extents 231, 232 correspond to the data extent references set 120, catalog 135, and extents 130 shown in FIG. 1A.

The tenant data can be stored in a physically contiguous manner to allow for the location of the tenant data in physical storage to be described by a small amount of metadata. That is, tenant data in the physical storage can be stored and cataloged in a continuous order. In this manner, a reduced amount of metadata may be used to describe the key range of the tenant data extents, e.g., for the extent having the extent id "0x21", the data extent reference set 220 need only store a key start value of "10" and a key end value of "98" to define the extent as containing all the data recorded continuously in the key range of (10,98) in the physical storage.

Figure 3:
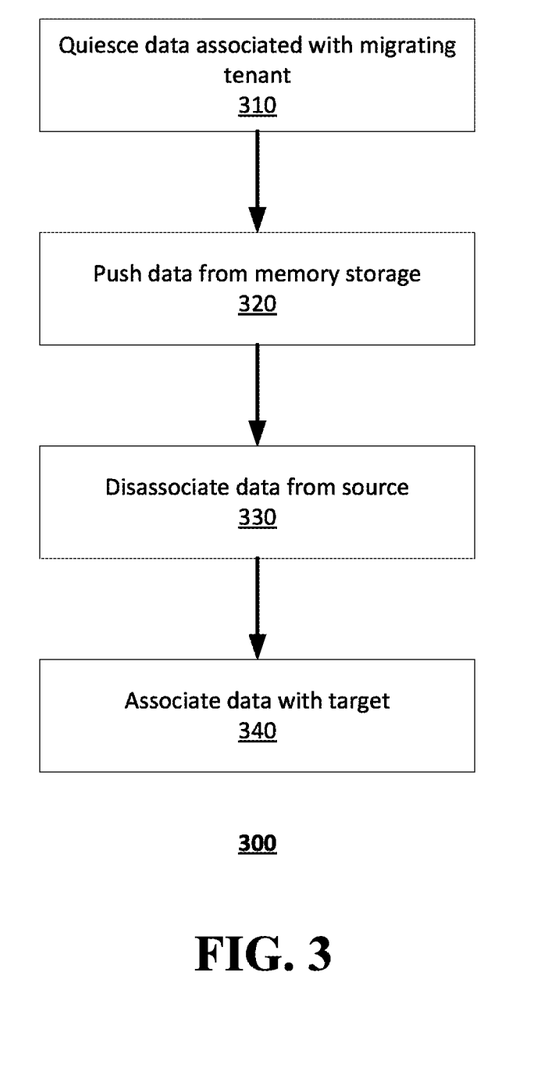
FIG. 3 shows a flowchart of operations to migrate the tenant data according to an implementation of the disclosed subject matter.

In this example migration, data associated with tenant 62 will be migrated from a source database instance at server 211 to a destination database instance at server 212. The destination database instance can be located on a physical server or virtualized server different from the source database instance. FIG. 3 shows a flowchart 300 of operations to migrate the tenant data according to an implementation of the disclosed subject matter.

At operation 310, data associated with tenant 62 is quiesced so that no new data is written to the storage of the database system associated with the tenant identifier at the source database instance. That is, the data is set to read-only at server 211 so that the server 211 cannot add to or change the data in physical storage for tenant 62.

At operation 320, the system 100 (FIG. 1A) checks the memory storage 125 for any data modification of tenant 62 data. If any changes are present in the memory storage, they are pushed out into the extents in the physical storage layer 227 (FIG. 2A) to ensure that the data is up-to-date. That is, any changes to data of tenant 62 are stored in the extents 231 of the physical storage layer 227.

At operation 330, the data is disassociated from the source database. FIG. 2B shows server 211 disassociating tenant 62 data. The extent references set 220 detaches tenant 62 data from server 211 by redefining the key range for server 211 to (10,11), (98,98) and setting the key range (62,62) to null. The tenant 62 is now efficiently removed from the source database instance of server 211 by the removal of the extent references associated with the tenant 62. FIG. 2B shows that server 211 now points to key range (10,11) and (98,98) while server 212 still points to the key range (33,66).

At operation 340, the data of tenant 62 is associated with the target server 212. The association can be executed by transmitting metadata of the tenant to be migrated (tenant 62 in the example shown in FIGS. 2A-2C) from the source database instance at server 211 to the destination database instance at server 212 and modifying, at the destination database instance, the metadata so that it points to the groupings of data in the physical storage for the tenant data to access the tenant data. The metadata of the tenant to be transmitted can include extent references to extents of the tenant data in the storage. FIG. 2C shows sever 212 being associated with tenant 62 data based on the metadata from server 211. The extent references set 220 redefines the key range for server 212 to include (33,44), (62,62), (66,66). Tenant 62 has now been migrated from server 211 to server 212. This operation can be executed relatively quickly because it only requires metadata changes; no tenant data need be copied at the physical storage layer or otherwise.

An example migration may include when Company X may need to migrate the data of Business Unit Z from the database system of server 211 to the server 212 of the database system shown in FIG. 2A. Both Company X and Business Unit Z may be tenants of the database system of server 211. This migration may be performed to load balance the requests received for servers 211 and 212, so that server 211 is not overloaded with queries for both the tenant data of Company X and the tenant data of Business Unit Z.

In this example, the data of Business Unit Z (e.g., associated with tenant 62 shown in FIGS. 2A-2C) may be migrated from a source database instance at server 211 to a destination database instance at server 212 to load balance the number of queries to servers 211 and 212. The destination database instance (e.g., server 212) may be located on a different physical server or virtualized server from the source database instance (e.g., server 211). FIG. 3 shows operations to migrate the tenant data of the Business Unit Z from the server 211 to the server 212.

At operation 310, the data for the Business Unit Z associated with tenant 62 is quiesced so that no new data is written to the storage of the database system associated with the tenant identifier at the source database instance (e.g., server 211). That is, the data of Business Unit Z is set to read-only at server 211 so that the server 211 cannot add to or change the data in physical storage for Business Unit Z (e.g., tenant 62).

At operation 320, the system checks for any data modification of the data for the Business Unit Z (e.g., tenant 62 data). If any changes are present, they are pushed out into the extents in the physical storage layer 227 (FIG. 2A) to ensure that the data of Business Unit Z (e.g., tenant 62) is up-to-date. That is, any changes to data of Business Unit Z (e.g., tenant 62 data) are stored in the extents 231 of the physical storage layer 227.

At operation 330, the Business Unit Z data is disassociated from the source database. FIG. 2B shows server 211 disassociating the data of Business Unit Z (e.g., tenant 62 data) from the server 211. The extent references set 220 detaches Business Unit Z data (e.g., tenant 62 data) from server 211 by redefining the key range for server 211 to (10,11), (98,98) and setting the key range (62,62) to null. Business Unit Z is now removed from the source database instance of server 211 by the removal of the extent references associated with Business Unit Z (e.g., tenant 62). FIG. 2B shows that server 211 now points to key range (10,11) and (98,98) while server 212 still points to the key range (33,66).

At operation 340, the data of Business Unit Z (e.g., tenant 62) is associated with the target server 212. The association can be executed by transmitting metadata of the Business Unit Z (e.g., tenant 62) from the source database instance at server 211 to the destination database instance at server 212 and modifying, at the destination database instance, the metadata so that it points to the groupings of data in the physical storage for the tenant data to access the tenant data. The metadata of Business Unit Z can include extent references to extents of the tenant data in the storage. FIG. 2C shows sever 212 being associated with Business Unit Z data (e.g., tenant 62 data) based on the metadata from server 211. The extent references set 220 redefines the key range for server 212 to include (33,44), (62,62), (66,66). Business Unit Z has now been migrated from server 211 to server 212, and the number of queries to servers 211 and 212 may be more balanced than prior to the migration of Business Unit Z.

According to the above-described implementations, a destination database instance can be located on a different physical server or virtualized server than a source database instance because the physical storage for the destination database instance is shared with the source database instance. Furthermore, at least some of the metadata in the destination database instance can point to the same data in the storage as at least some of the metadata in the source database instance, without inter-database coordination.

The disclosed implementations may overcome important limitations in traditional tenant migration technology. More specifically, a traditional tenant migration is relatively slow because it takes time to copy all the necessary data, and check to see if the copied data is consistent with the original data set. Such traditional systems and methods are also relatively resource-heavy (i.e., they require a substantial amount of computing, datapath, network, and/or storage resources to copy an entire set of data), and error prone. For example, the data often cannot be copied correctly, portions of data needed for the migration may be missing, data to be migrated can be corrupted, or the like. For example, executing a tenant migration using traditional systems and methods often involves copying all the rows for the tenant data into a database. Copying row-by-row can be slow and resource intensive, on both the source and the target database, and it can effectively double the tenant's storage at least temporarily. It is also often not practical to copy all a tenant's data in a single transaction, so there can be a complicated process of reconciling inconsistent data. Migration of a tenant according to the disclosed implementations is almost instantaneous, takes no extra storage space, and is fully consistent.

Figure 4:
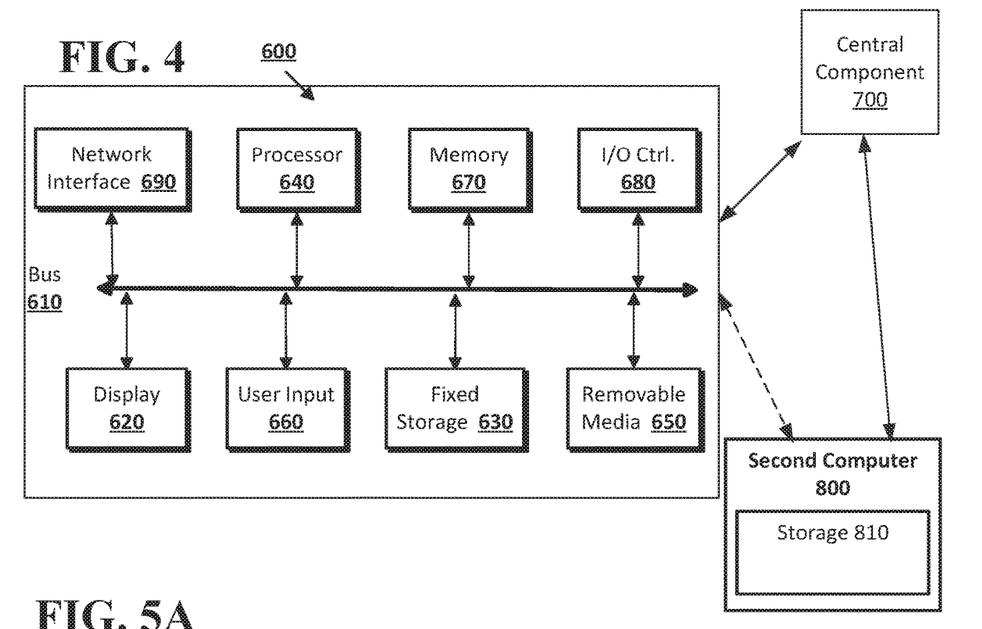
FIG. 4 shows a computer according to an implementation of the disclosed subject matter.

Implementations of the presently disclosed subject matter may be implemented in and used with a variety of component and network architectures. FIG. 4 is an example computer 600 suitable for implementing implementations of the presently disclosed subject matter. As discussed in further detail herein, the computer 600 may be a single computer in a network of multiple computers. As shown in FIG. 4, the computer 600 may communicate with a central or distributed component 700 (e.g., server, cloud server, database, cluster, application server, etc.). The central component 700 may communicate with one or more other computers such as the second computer 800, which may include a storage device 810. The second computer 800 may be a server, cloud server, or the like. The storage 810 may use any suitable combination of any suitable volatile and non-volatile physical storage mediums, including, for example, hard disk drives, solid state drives, optical media, flash memory, tape drives, registers, and random access memory, or the like, or any combination thereof.

Figure 5A:
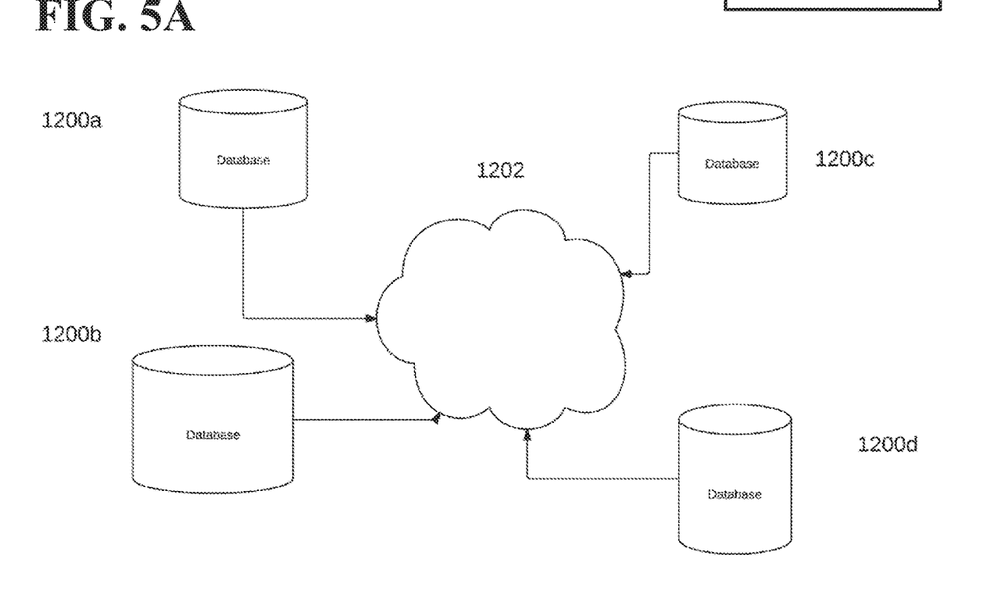
FIGS. 5A-5B show a network configuration according to an implementation of the disclosed subject matter.
Figure 5B:
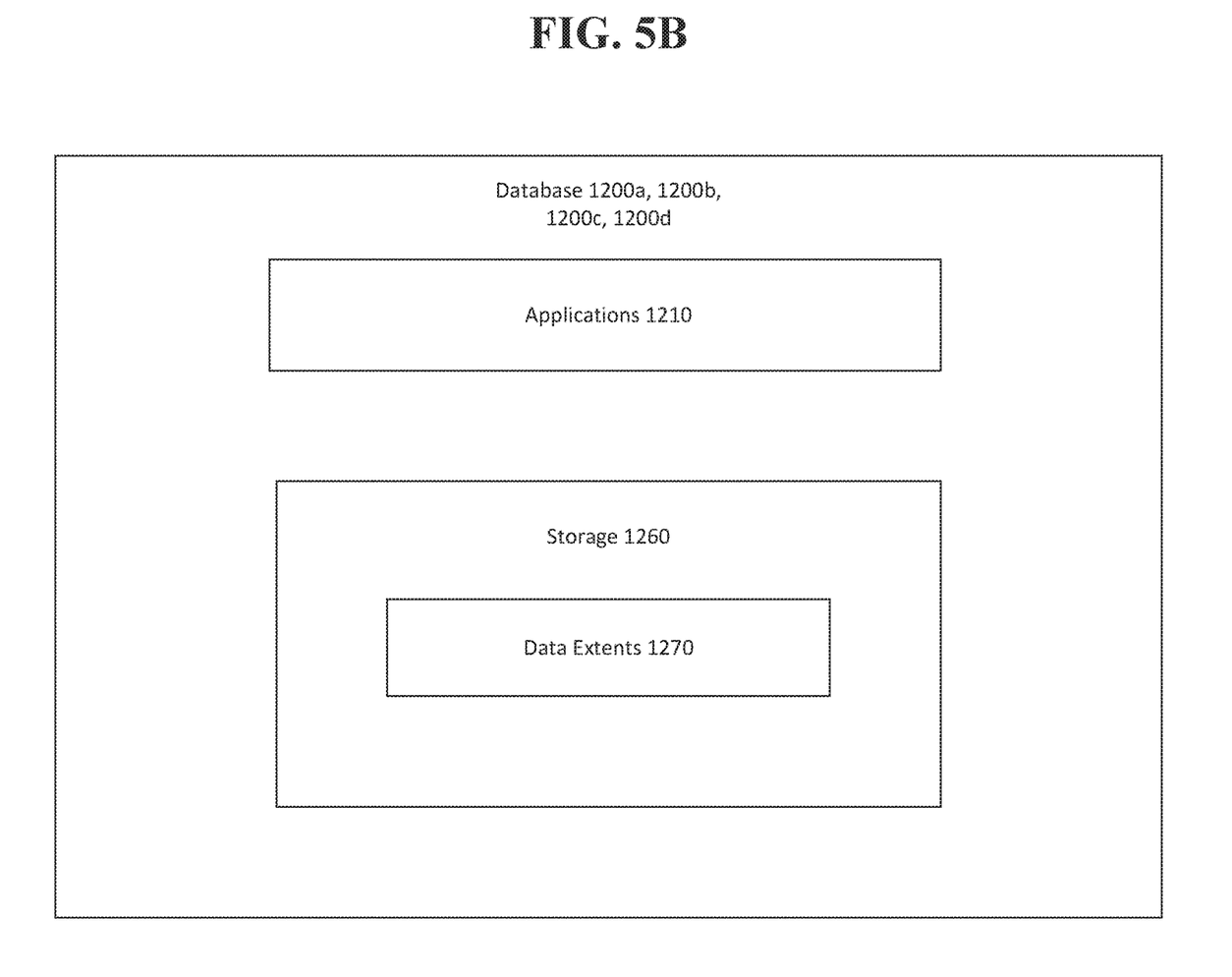

Data can be stored in any suitable format in, for example, the storage 810, using any suitable filesystem or storage scheme or hierarchy. For example, the storage 810 can store data using a log structured merge (LSM) tree with multiple levels. Further, if the systems shown in FIGS. 4-5 are multitenant systems, the storage can be organized into separate log structured merge trees for each instance of a database for a tenant. Alternatively, contents of all records on a particular server or system can be stored within a single log structured merge tree, in which case unique tenant identifiers associated with versions of records can be used to distinguish between data for each tenant as disclosed herein. More recent transactions can be stored at the highest or top level of the tree and older transactions can be stored at lower levels of the tree. Alternatively, the most recent transaction or version for each record (i.e., contents of each record) can be stored at the highest level of the tree and prior versions or prior transactions at lower levels of the tree.

The information obtained to and/or from a central component 700 can be isolated for each computer such that computer 600 cannot share information with computer 800. Alternatively, or in addition, computer 600 can communicate directly with the second computer 800.

The computer (e.g., user computer, enterprise computer, etc.) 600 includes a bus 610 which interconnects major components of the computer 600, such as a central processor 640, a memory 670 (typically RAM, but which can also include ROM, flash RAM, or the like), an input/output controller 680, a user display 620, such as a display or touch screen via a display adapter, a user input interface 660, which can include one or more controllers and associated user input or devices such as a keyboard, mouse, Wi-Fi/cellular radios, touchscreen, microphone/speakers and the like, and can be closely coupled to the I/O controller 680, fixed storage 630, such as a hard drive, flash storage, Fibre Channel network, SAN device, SCSI device, and the like, and a removable media component 650 operative to control and receive an optical disk, flash drive, and the like.

The bus 610 enable data communication between the central processor 640 and the memory 670, which can include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 600 can be stored on and accessed via a computer readable medium, such as a hard disk drive (e.g., fixed storage 630), an optical drive, floppy disk, or other storage medium 650.

The fixed storage 630 can be integral with the computer 600 or can be separate and accessed through other interfaces. The fixed storage 630 may be part of a storage area network (SAN). A network interface 690 can provide a direct connection to a remote server via a telephone link, to the Internet via an internet service provider (ISP), or a direct connection to a remote server via a direct network link to the Internet via a POP (point of presence) or other technique. The network interface 690 can provide such connection using wireless techniques, including digital cellular telephone connection, Cellular Digital Packet Data (CDPD) connection, digital satellite data connection or the like. For example, the network interface 690 can enable the computer to communicate with other computers and/or storage devices via one or more local, wide-area, or other networks, as shown in FIGS. 5A-5B.

Many other devices or components (not shown) can be connected in a similar manner (e.g., data cache systems, application servers, communication network switches, firewall devices, authentication and/or authorization servers, computer and/or network security systems, and the like). Conversely, all the components shown in FIGS. 5A-5B need not be present to practice the present disclosure. The components can be interconnected in different ways from that shown. The operation of a computer such as that shown in FIG. 10 is readily known in the art and is not discussed in detail in this application. Code to implement the present disclosure can be stored in computer-readable storage media such as one or more of the memory 670, fixed storage 630, removable media 650, or on a remote storage location.

FIGS. 5A-5B shows an example network arrangement according to an implementation of the disclosed subject matter. Four separate database systems 1200*a-d* at different nodes in the network represented by cloud 1202 communicate with each other through networking links 1204 and with users (not shown). Each of database systems 1200 can be operable to host multiple instances of a database, where each instance is accessible only to users associated with a particular tenant. Each of the database systems can constitute a cluster of computers along with a storage area network (not shown), load balancers and backup servers along with firewalls, other security systems, and authentication systems. Some of the instances at any of systems 1200 can be live or production instances processing and committing transactions received from users or from computing elements (not shown) for ingesting and providing data for storage in the instances.

One or more of the database systems 1200*a*-1200*d* can be selected as a source or destination for tenant data at any time. For example, an administrator or one or more authorized users of the database systems 1200*a*-1200*d* that are associated with the tenant can request that a tenant data be migrated to one of the database systems 1200*a*-1200*d*. The system, for example 1200*c*, can include at least one storage device, such as in FIGS. 5A-5B. For example, the storage can include memory 670, fixed storage 630, removable media 650, a storage device included with the central component 700 and/or the second computer 800, and/or one or more storage devices associated with one or more of the database systems 1200*a*-1200*d*. The tenant can have tenant data stored in an immutable storage of the at least one storage device associated with a tenant identifier.

FIG. 5B shows an individual database system 1200*a*, 1200*b*, 1200*c*, or 1200*d* according to an implementation of the disclosed subject matter. The database systems 1200a-1200c may have storage 1260, which may include one or more storage devices that provide persistent storage of data (e.g., tenant data). The database system 1200a, 1200b, 1200c, or 1200d may include one or more applications 1210, which may use data and/or information from the node 1220 and/or the storage 1260, which may be one or more storage devices. Applications 1210 may include customer relationship management (CRM) applications or the like. Storage 1260 may be one or more storage devices, and may store data extents 1270 which may include tenant data.

In some implementations, the one or more servers shown in FIGS. 4-5B can store the data in the immutable storage of the at least one storage device (e.g., a storage device associated with central component 700, the second computer 800, and/or the database systems 1200a-1200d) using a log-structured merge tree data structure.

The systems and methods of the disclosed subject matter can be for single tenancy and/or multitenancy systems. Multitenancy systems can allow various tenants, which can be, for example, users, groups of users, or organizations, to access their own records on the server system through software tools or instances on the server system that can be shared among the various tenants. The contents of records for each tenant can be part of a database containing that tenant. Contents of records for multiple tenants can all be stored together within the same database, but each tenant can only be able to access contents of records which belong to, or were created by, that tenant. This may allow a database system to enable multitenancy without having to store each tenants' contents of records separately, for example, on separate servers or server systems. The database for a tenant can be, for example, a relational database, hierarchical database, or any other suitable database type. All records stored on the server system can be stored in any suitable structure, including, for example, an LSM tree.

Further, a multitenant system can have various tenant instances on server systems distributed throughout a network with a computing system at each node. The live or production database instance of each tenant can only have its transactions processed at one computer system. The computing system for processing the transactions of that instance can also process transactions of other instances for other tenants.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "transmitting," "modifying," "sending," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:

1. A computerized method for migrating a tenant of a database system from a source database instance to a destination database instance, the tenant having tenant data stored in an immutable storage of the database system associated with a tenant identifier to be migrated to the destination database instance, the immutable storage including groupings of data having pointers to physical locations of storage and wherein the groupings of data include metadata to access at least portions of the data in the storage, the method comprising:
quiescing the tenant data of the tenant to be migrated from the source database instance to the destination database instance so that no new data is written to the storage of the database system associated with the tenant identifier at the source database instance;
transmitting metadata of the tenant to be migrated from the source database instance to the destination database instance without moving the tenant data in the storage, wherein the destination database instance is located on a physical server or virtualized server different from the source database instance, wherein the metadata includes extent references to extents of the tenant data in the storage, key ranges of the extents, and tenant identifier data for the extents, and wherein at least one key of the key ranges includes the tenant identifier to associate the tenant with the tenant data; and
modifying, at the destination database instance, a key range of the tenant data in the metadata of the tenant by adding at least one new extent reference to the destination database instance's active extent reference set that contains keys for the tenant being migrated from the source database instance so that the destination database instance points to the groupings of data in the storage for the destination database to access the tenant data, without moving the tenant data in the storage.

2. The computerized method of claim 1, wherein the destination database instance that is located on the different physical server or virtualized server than the source database instance is configured to access the storage, wherein the storage for the destination database instance is shared with the source database instance.

3. The computerized method claim 1, further comprising:
ordering the tenant data to allow for the location of the tenant data in the storage to be described by metadata, as the tenant data is physically contiguous.

4. The computerized method of claim 1, wherein at least some of the metadata in the destination database instance points to the same data in the storage as at least some of the metadata in the source database instance, without inter-database coordination.

5. The computerized method of claim 1, further comprising:
when the tenant has been migrated from the source database instance to the destination database instance, removing the tenant from the source database instance by removing the tenant's extent references in the metadata in the source database instance.

6. The computerized method of claim 1, further comprising:
storing the tenant data in the storage using a log-structured merge tree data structure.

7. A system to migrate a tenant of a database system from a source database instance to a destination database instance, the system comprising:
at least one physical storage device to store tenant data associated with a tenant identifier of the tenant to be migrated to the destination database instance, the at least one physical storage device including groupings of data have pointers to physical locations of the at least one physical storage device and wherein the groupings of data include metadata to access at least portions of the data in the at least one physical storage device; and
one or more servers for the source database instance and the destination database instance that are communicatively coupled to the at least one physical storage device, the one or more servers to quiesce the tenant data of the tenant to be migrated from the source database instance to the destination database instance so that no new data is written to the at least one physical storage device of the database system associated with the tenant identifier at the source database instance, transmit metadata of the tenant to be migrated from the source database instance to the destination database instance without moving the tenant data in the at least one physical storage, wherein the destination database instance is located on a different physical server or virtualized server than the source database instance, and wherein the metadata includes extent references to extents of the tenant data in the at least one physical storage, key ranges of the extents, and tenant identifier data for the extents, wherein at least one key of the key ranges includes the tenant identifier to associate the tenant with the tenant data, and modify, at the destination database instance, a key range of the tenant data in the metadata of the tenant by adding at least one new extent reference to the destination database instance's active extent reference set that contains keys for the tenant being migrated from the source database instance so that the destination database instance points to the groupings of data in the at least one physical storage device for the tenant data to access the tenant data, without moving the tenant data in the at least one physical storage.

8. The system of claim 7, wherein the destination database instance that is located on the different physical server or virtualized server than the source database instance is configured to access the at least one physical storage device, wherein the at least one physical storage device for the destination database instance is shared with the source database instance.

9. The system of claim 7, wherein the at least one server orders the tenant data to allow for the location of the tenant data in the at least one physical storage device to be described by metadata, as the tenant data is physically contiguous.

10. The system of claim 7, wherein at least some of the metadata in the destination database instance points to the same data in the at least one physical storage device as at least some of the metadata in as the source database instance, without inter-database coordination.

11. The system of claim 7, wherein when the tenant has been migrated from the source database instance to the destination database instance, the at least one server removes the tenant from the source database instance by removing the tenant's extent references in the metadata in the source database instance.

12. The system of claim 7, wherein the at least one server stores the tenant data in the at least one physical storage using a log-structured merge tree data structure.

* * * * *